(12) United States Patent
Haber et al.

(10) Patent No.: US 7,433,891 B2
(45) Date of Patent: Oct. 7, 2008

(54) DATA MANAGEMENT INTERFACE CAPABLE OF PROVIDING ENHANCED REPRESENTATION OF IMPORTED ELECTRONIC CONTENT

(75) Inventors: Tony P. Haber, Portland, OR (US); Kim L. Hadfield, Vancouver, WA (US); Brian S. Majewski, Vancouver, WA (US); Jonathon P. Hager, Sherwood, OR (US)

(73) Assignee: Chrome Systems Corporation, Portland, OR (US)

( * ) Notice: Subject to any disclaimer, the term of this patent is extended or adjusted under 35 U.S.C. 154(b) by 0 days.

(21) Appl. No.: 10/269,907

(22) Filed: Oct. 11, 2002

(65) Prior Publication Data

US 2004/0073564 A1 Apr. 15, 2004

(51) Int. Cl.
*G06F 17/00* (2006.01)
(52) U.S. Cl. .................................. 707/104.1; 707/101
(58) Field of Classification Search ................ 707/100, 707/101, 104.1, 1; 705/28, 26, 27
See application file for complete search history.

(56) References Cited

U.S. PATENT DOCUMENTS

| | | | |
|---|---|---|---|
| 5,781,911 A | 7/1998 | Young et al. | |
| 5,974,441 A | 10/1999 | Rogers et al. | |
| 6,260,050 B1 | 7/2001 | Yost et al. | |
| 6,795,819 B2* | 9/2004 | Wheeler et al. | 707/3 |
| 2002/0103727 A1* | 8/2002 | Tait et al. | 705/28 |
| 2002/0144174 A1 | 10/2002 | Nwabueze | |
| 2003/0065413 A1* | 4/2003 | Liteplo et al. | 700/96 |
| 2004/0019535 A1* | 1/2004 | Perkowski | 705/27 |

OTHER PUBLICATIONS

Chaudhuri, S., et al., "An Overview of Data Warehousing and OLAP Technology," Sigmond Record, ACM, New York, NY, US, vol. 26, No. 1, Mar. 1997, pp. 65-74.

* cited by examiner

*Primary Examiner*—Uyen Le
(74) *Attorney, Agent, or Firm*—Goodwin Procter LLP

(57) ABSTRACT

Embodiments of a data management interface (DMI) and associated methods are generally described. According to but one example embodiment, a method is introduced comprising importing content describing product inventory from one or more disparate data sources of such content, the content including one or more standard product descriptors that uniquely identify an individual instance of a product, selectively modifying the imported content based, at least in part, on content associated with the uniquely identified instance of the product obtained from an independent resource, and exporting the selectively modified content to any one or more of a number of media.

20 Claims, 8 Drawing Sheets

DATA MANAGEMENT INTERFACE CAPABLE OF PROVIDING ENHANCED REPRESENTATION OF IMPORTED ELECTRONIC CONTENT

TECHNICAL FIELD

Embodiments of the invention generally relate to the field of data management and, more particularly, to a data management interface (DMI) and related methods.

BACKGROUND

The proliferation of data management systems date back to the dawn of computers themselves. Entire companies have been built around the concept of providing a "better" data management system. Companies like Oracle, Seibel Systems, EDS and the like each offer data management systems to handle any number of tasks, or may be engaged to custom design such data management system to suit a particular market or product need.

Examples of such custom data management systems abound in markets ranging from real estate to automobile dealerships. More particularly, a number of inventory management systems have been developed that enable a realtor, auto dealer, retailer, etc. to intelligently manage inventory. Within the automotive industry, for example, no less than ten (10) different dealer management systems (data management systems tailored to managing the autodealers operation, including inventory management) are available, systems such as ADAM, ADP Advantage, ADP Alliance, ADP Elite, Advent, AutoMate, Dealer Solutions, KarPower, ProMax, Reynolds & Reynolds, and UCS are available from their respective creators.

Unfortunately, each of these data management systems use proprietary data formats to describe the inventory, and the layout of the data structures, user interfaces, etc. also vary from company to company. Such systems are usually not very intuitive and, as such, require that someone within a business learn and become proficient at using the system. Such a person, then, is responsible for entering, modifying and updating the information within the data management system. It is a paradigm prone to mistakes and the perpetuation of outdated information.

Another limitation, rooted in the proprietary nature of the custom data management systems, is that it is difficult if not impossible to share information across multiple systems and/or departments within an organization. In a typical car dealership, for example, the dealer management system tracks inventory, but cannot readily transport information to marketing for use in print or electronic advertising. That is, such conventional systems are not extensible to port their content to other currently existing media, or to new media as it is developed, which may have different data formats.

Thus, an improved data management interface is required that addresses one or more of the limitations commonly associated with conventional data management systems.

BRIEF DESCRIPTION OF THE DRAWINGS

Embodiments of the invention are illustrated by way of example, and not by way of limitation, in the figures of the accompanying drawings in which like reference numerals refer to similar elements and in which.

DETAILED DESCRIPTION

Figure 1:
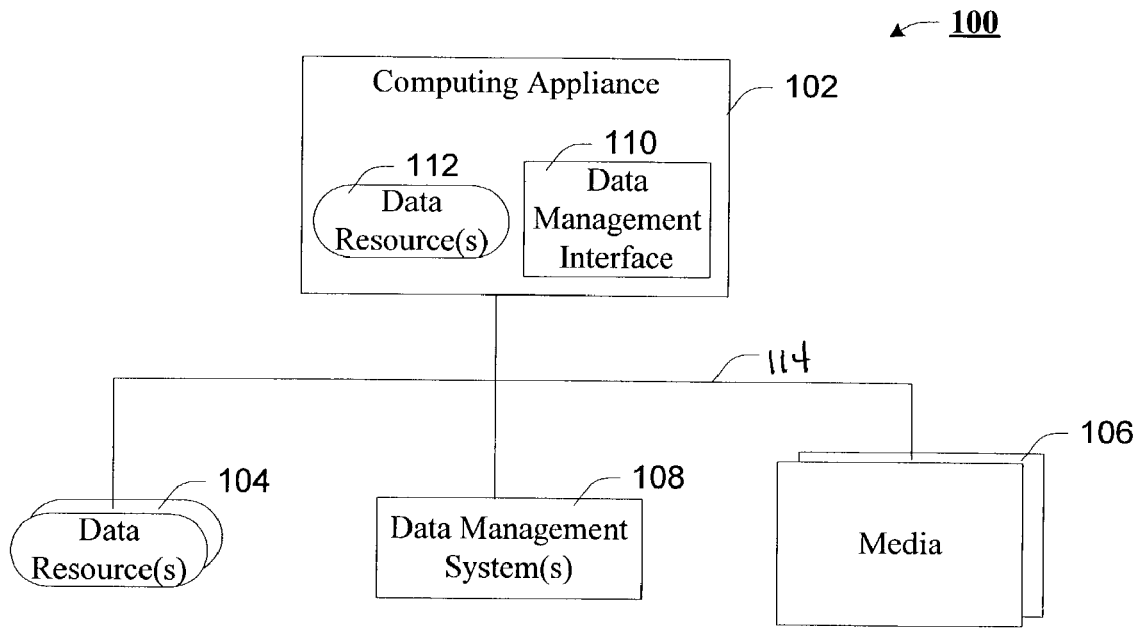
FIG. 1 is a block diagram of an example operating environment within which the teachings of the present invention may be practiced.

Embodiments of the invention are generally directed to a data management interface that enables a user to traverse otherwise disparate data management systems and export media. As will be developed more fully below, the data management interface (DMI) of the present invention allows a user to import content from any of a number of otherwise disparate data management sources, reconcile and enhance the imported content (a concept referred to herein as reverse configuration), analyze the enhanced content, and configure the enhanced content in any of a number of data formats for selective distribution to any of a variety of media. The DMI of the present invention provides a single interface to support any of a number of data management system sources, and generates a description of an inventory with seamless consistency among all export destinations.

In this regard, according to but one example embodiment of the invention, a method is introduced comprising importing content describing product inventory from one or more disparate data sources of such content, the content including one or more standard product descriptors that uniquely identify an individual instance of a product, selectively modifying the imported content based, at least in part, on content associated with the uniquely identified instance of the product obtained from an independent resource, and exporting the selectively modified content to any one or more of a number of media.

It will be apparent, from the description to follow, that the DMI enables an administrator to import data from most major data management systems (DMS) (e.g., a dealer management system) with one click of a mouse; quickly edit and enhance product information; prioritize the online presentation of information regarding a particular product instance; associate a virtually unlimited number of photos with a product record; export to web-based and print-based services with one click of a mouse; print customer brochures, buyers guides, etc. with a single click of the mouse; view and print any of a number of detail and summary reports; sort inventory by any of several criteria including, e.g., days-in-stock, etc.; and group inventory records into self-defined, color-coded aging categories. According to one example embodiment, the DMI is the Chrome Inventory Everywhere™ (CIE) product available from Chrome Systems®.

For clarity of description, the DMI of the present invention will be described with reference to architectural block diagrams, operational flow charts, and graphical representations of example user interface(s) that may well be used in accordance with but one example implementation. For purposes of illustration, and not limitation, the teachings of the present invention will be described in the context of an example operational environment of an automotive dealership. It will be apparent to all, based on the description to follow, that applications or implementations of the DMI are not limited in this regard, and may well be applied to other applications, e.g., a real estate application, retail applications, and the like.

Appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Network Environment

FIG. 1 provides a block diagram of an example network environment within which the innovative data management interface (DMI) may well be practiced. As shown, a computing appliance (e.g., computer system, network server, etc.) 102 is coupled to one or more remote data resources 104, one or more data management system(s) 108, and export media 106 through one or more network(s) 114. Computing appliance 102 is populated with one or more instances of the innovative data management interface (DMI) 110 and, optionally, one or more local data resource(s) 112.

As introduced in detail below, once configured, data management interface (DMI) 110 periodically (e.g., determined by the administrator (user)) imports content describing a current product inventory from one or more data management systems, e.g., DMS 108. During the importation process, the imported content is mapped from one or more selected proprietary DMS format(s) into a DMI-compliant format. According to one example implementation, the content describes individual automobiles resident within an automobile dealer's inventory, and is imported into the DMI 110 from one or more dealer management system.

Once the content has been imported, DMI 110 reconciles the imported data against an independent source of product information. In the case of our example automotive implementation, the independent source of product information is preferably the Chrome Systems® New Vehicle Database (NVD). The NVD, accessed through, e.g., a network connection, provides an accurate list of standard and optional product features against which the individual records (i.e., representing individual automobiles) of the DMS 108 are compared, and inconsistencies resolved—a process colloquially referred to as "scrubbing". In alternate implementations, the independent source of product information may come from one or more manufacturers of the product, governmental sources, insurance sources, etc. Thus, according to one aspect of the present invention, DMI 110 generates a more accurate and/or more precise description of a product inventory.

Once an accurate list of the inventory is established, DMI 110 provides any of a number of user interface(s) through which an administrator can analyze various attributes of the (scrubbed) content describing the inventory. Examples of such analysis include the generation of aging reports (i.e., describing the inventory by how long it has been in the DMS), profitability reports, efficiency reports, sales performance reports, market trends, and the like. Additionally, DMI 110 provides one or more interface(s) through which the reconciled content is supplemented and/or modified by an administrator to yield a more accurate description of a product inventory, which may then be exported to any of a number of media 106.

But for their interaction with DMI 110, each of the elements 102-108, 112 and 114 are intended to represent such devices, resources, media and networks as they are commonly known in the art. In this regard, network 114 may well be a combination of local data networks, wide area networks, a global public internetwork (e.g., the Internet), and the like. Media services 106 includes, but is not limited to, web-based services, local print services, marketing services (e.g., newspaper, magazine, etc.) and the like.

Example Data Management Interface (DMI)

Figure 2:
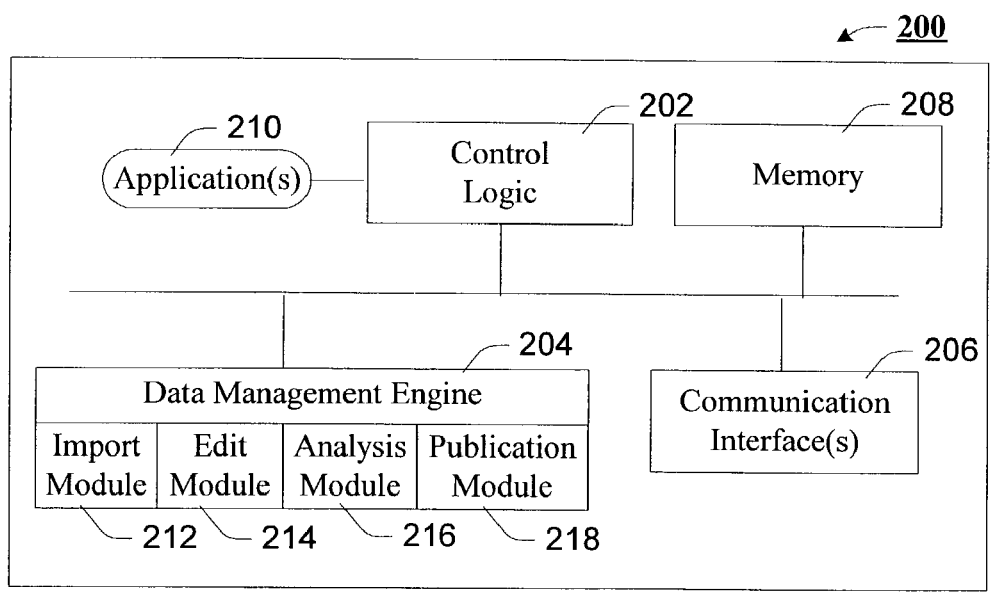
FIG. 2 is a block diagram of an example data management interface (DMI), according to one example embodiment of the invention.

Turning to FIG. 2, an example architectural diagram of an example data management interface (DMI) embodiment is presented, according to one example embodiment of the present invention. According to one example implementation, DMI 200 may well be used in network 100 as DMI 110. As introduced herein, DMI 200 is embodied as executable content (e.g., software) selectively invoked by control logic of a host computing appliance (e.g., 102). It should be appreciated, however, that DMI 200 is not limited in this regard. That is, DMI 200 may well be implemented in hardware using, e.g., an application specific integrated circuit (ASIC), field programmable gate array (FPGA), microcontroller, microprocessor, and the like. Moreover, although depicted as comprising a number of seemingly disparate functional modules, those skilled in the art will appreciate that the DMI 200 of greater or lesser complexity are anticipated within the scope and spirit of the present invention.

In accordance with the illustrated example implementation of FIG. 2, DMI 110 is depicted comprising control logic 202, a data management engine 204 incorporating the teachings of the present invention, communication interface(s) 206, memory 208 and, optionally, one or more application(s) 210, each coupled as shown. Data management engine 204 is depicted comprising one or more of an import module 212, edit module 214, analysis module 216 and a publication, or export, module 218, each of which will be described more fully below.

Control logic 202 controls the overall operation of the DMI 200 and is, in this regard, responsive to the control of an administrator using a host computing appliance (e.g., 102). In response to control input from a user, control logic 202 selectively invokes an instance of one or more of input module 212, edit module 214, analysis module and/or publication module 218 of the data management engine 204.

As used herein, control logic 202 controls the overall operation of the DMI 200. According to one example implementation, DMI 200 is configured and selectively invoked by an administrator of a host computing appliance on which DMI 200 is implemented. In this regard, control logic 202 is responsive to the administrator, or the configuration settings established by the administrator and may, in this regard, include elements of a user interface. In response to an administrators command, or configuration settings established by an administrator (or, purveyor of the DMI), control logic 202 selectively invokes one or more functional elements of the data management engine 204 to effect the teachings of the present invention.

Communication interface(s) 206 enable DMI 200 to interface with remote devices, data resources, and/or media. In this regard, communication interface(s) 206 may well include input/output interface(s), network communication interface (s), and the like. But for their interaction with data management engine 204, such interface(s) are intended to represent any of the wide range of communication interfaces commonly known in the art and, as such, need not be further described.

DMI 200 is depicted comprising memory 208. According to one example embodiment, described more fully below, memory 208 is used by control logic 202 and one or more elements of data management engine 204 in support of the features of DMI disclosed herein. In this regard, one or more data structure(s) are generated and updated with information from each of such modules, as described below. As used herein, memory 208 may represent actual memory elements of, e.g., a host computing appliance, or variables (local or global) resident within an executing software/firmware.

As introduced above, data management engine 204 is depicted comprising one or more of an import module 212, edit module 214, analysis module 216 and a publication (or, export) module 218. One of the features of DMI 200 is the ability to import data from any of a number of DMS systems, and reconfigure the data into a common DMI-compliant data set. As introduced above, import module 212 is selectively invoked by control logic 202 in response to a command received from an administrator, or automatically on a period basis as defined by an administrator during a configuration of the DMI. In general, import module 212 accesses one or more DMS 108, and maps the data received from the DMS into a DMI compliant format. According to one example implementation, the path to the DMS 108 and the type of DMS 108 are configured within the DMI by an administrator of the DMI, perhaps with the assistance of technical support of the purveyor of the DMI 200.

According to one example implementation, import module 212 maps the content from a DMS format into a DMI compliant format according to mapping rules. In this regard, DMI 200 includes (e.g., in memory 208) a file of mapping rules for each of a number of DMS systems. On configuration of the DMI, an administrator selects one or more of the DMS systems from which content is to be imported, and import module 212 accesses an appropriate one or more mapping files with which to complete the import process. A set of mapping rules for supported DMS systems are supplied with the DMI 200 and are loaded into memory 208 for use by import module 212 upon invocation of the DMI 200 by a processor of host computing appliance 102. According to one example implementation, DMI 200 is extensible to support DMS systems that have yet to be developed with the download of a new mapping file providing the translation parameters from the new DMS data format to the DMI compliant data format.

Once the content has been imported into a DMI compliant form, control logic 202 selectively invokes an instance of edit module 214 to reconcile and selectively supplement the imported content, a process colloquially referred to as reverse configuration. Often, in a configuration process, a product with a number of options are encoded with a unique product identifier. In this case, the edit module 214 works with information from the DMS and from independent data source(s) 104 (e.g., Chrome NVD) to extract product detail from a DMS product code.

According to one aspect of the present invention, DMI 200 compares data records for individual instances of a product (e.g., individual vehicles) against an independent source of data regarding such products. According to one example implementation, edit module 214 accesses a current version of Chrome Systems® New Vehicle Data™ and reconciles such data records based, e.g., on unique product identifier(s). In the automotive context, a unique product identifier may well include a vehicle identification number (VIN) that uniquely identifies an individual vehicle. In a real-estate context, the unique product identifier may well include a government tax locator value, a Realtor® identification number, a Multiple Listing Service (MLS), universal product code (UPC), product serial number (e.g., ISBN), and the like. As will be discussed more fully below, edit module 214 identifies and reconciles erroneous information and duplicate records to produce a single, accurate description of a current product inventory. In this regard, DMI 200 generates a more accurate and/or more precise description of a product inventory.

In addition to the reconciliation process introduced above, edit module 214 also provides an interface through which an administrator may supplement the data obtained from the DMS and/or the independent source of product information. As will be developed more fully below, edit module 214 of DMI 200 enables an administrator to denote specific product equipment (e.g., options added, standard equipment removed, etc.), product condition, pricing information, and the ability to add one or more photos, videos or audio descriptions of the product.

In this regard, edit module 214 provides DMI 200 with the ability to take an individual element of product inventory defined by a product identifier within a DMS import and, using independent product information (e.g., Chrome NVD) treat it as a theoretical, or catalog view of the product. This reverse configuration augments the limited DMS information with information obtained from the independent source, and maps a DMS entry directly to an entry in the independent data source (e.g., Chrome StyleID, Chrome option codes and Chrome category codes (see, e.g., FIG. 7)).

Analysis module 216 provides an administrator with a number of tools with which to analyze current inventory, sales history, employee performance, etc. According to one example implementation, analysis module 216 includes a user interface through which reports regarding the current inventory, sales performance, employee performance, market trends, etc. can be selected for generation. According to one example implementation, a separate user interface is available which enables an administrator to perform any of a number of mathematical and statistical functions using any of a number of individual fields of the DMI data structure, providing an extensible analysis tool.

According to one aspect of the present invention, DMI 200 includes a publication module 218 that enables an administrator to define export parameters for the enhanced content of the DMI data structure. In this regard, publication module 218 includes a user interface that enables an administrator to define the media 106 where the enhanced content resident within the DMI data structure is published. Once the export media are defined, publication module 218 configures at least a select subset of the DMI data structure for export to the selected export media 106. According to one example embodiment, publication module 218 comprises a plurality of publication rules denoting file definitions, data format definitions, and the like, which are selectively applied to the DMI data to be exported to place the data in proper form for receipt and use by the select export media 106.

According to one embodiment, such publication rules are maintained in disparate publication rules files, one or more each associated with each supported export media 106. As new export media are defined, the addition of a publication rules file to the publication module 218 enables DMI to configure DMI data for export to the newly added export media 106. When preparing, or configuring, at least a subset of the content of the DMI data structure for export, publication module accesses the appropriate one or more publication rules files and configures the content as defined therein.

As used herein, export media 106 may well include web-based publishers, physical print-based publishers, email transmission, as well as local printers or storage media. According to one aspect of the invention, publication module 218 may also be invoked to print product brochures, buyers guides, window stickers, detailed marketing material, etc.

Operational Examples

Having introduced an example architecture and operating environment, example methods of DMI operation and associated example user interface(s) are presented with reference to FIGS. 3 through 12. For ease of illustration, and not limitation, the operation of the data management interface (DMI) will be developed with continued reference to FIGS. 1 and 2.

Figure 3:
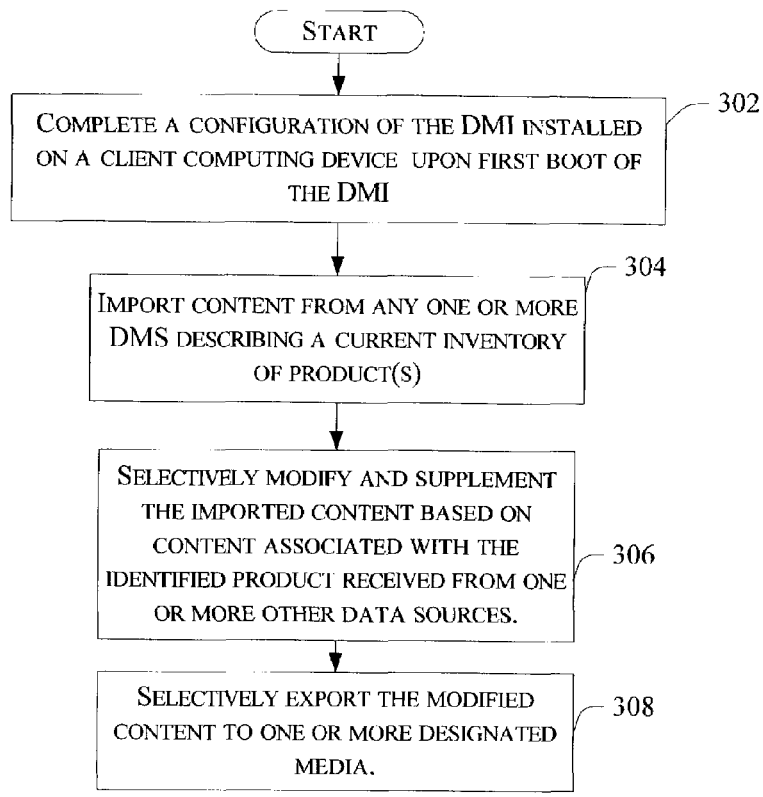
FIG. 3 is a flow chart of an example method of operation of the data management interface, according to one example embodiment of the invention.

FIG. 3 is a flow chart of an example method of DMI operation, according to but one example embodiment of the present invention. In accordance with the illustrated example implementation, method 300 begins with block 302, wherein an administrator of DMI 200 performs a configuration of DMI 200 installed on a client computing device (e.g., 102) upon an initial boot of the DMI 200. As introduced above, the configuration process is performed to define a path (or, connection) between the DMI 200 and the DMS source(s) 106, select the "type" of DMS source(s) 106, configure the import settings, and/or configure the publication (export) settings.

According to one example implementation, the configuration process is controlled through a "wizard" that automatically steps the administrator through a number of different questions, the answer to which serve to configure the DMI 200 for operation. Depending on the type of user performing the configuration, one or more aspects of the configuration, e.g., configuring the DMI 200 to properly interact with the DMS source 106, may be performed by a technical representative of the purveyor, e.g., through a network connection 116 to the DMI 200 on the client computing platform 102. Depending on the type of DMS source(s) used, any of a number of connection settings will need to be specified, e.g., network address, filename(s), password(s), field assignments, etc. An example user interface (UI) for performing one of such configurations is provided with reference to FIG. 4.

Figure 4:
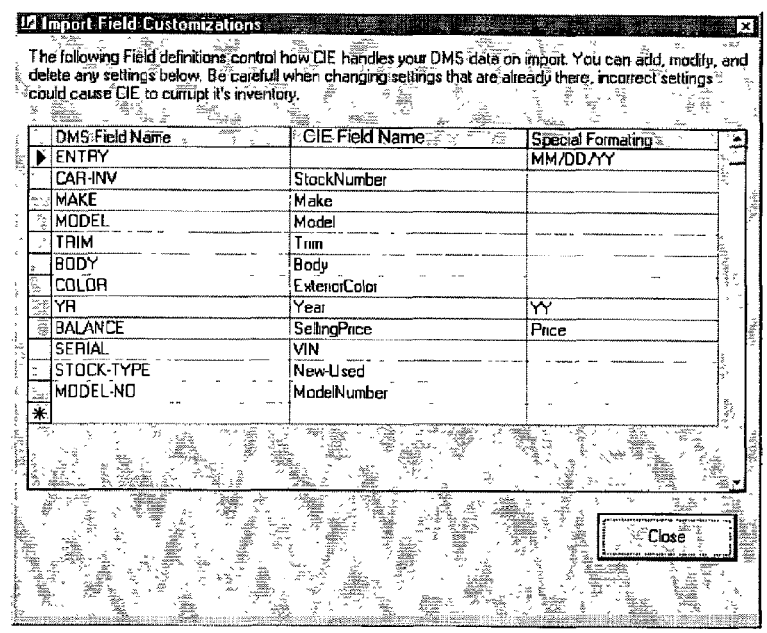
FIG. 4 is a graphical representation of an example user interface (UI) suitable for use in configuring at least one element of the DMI, according to one example embodiment of the invention.
Figure 10:
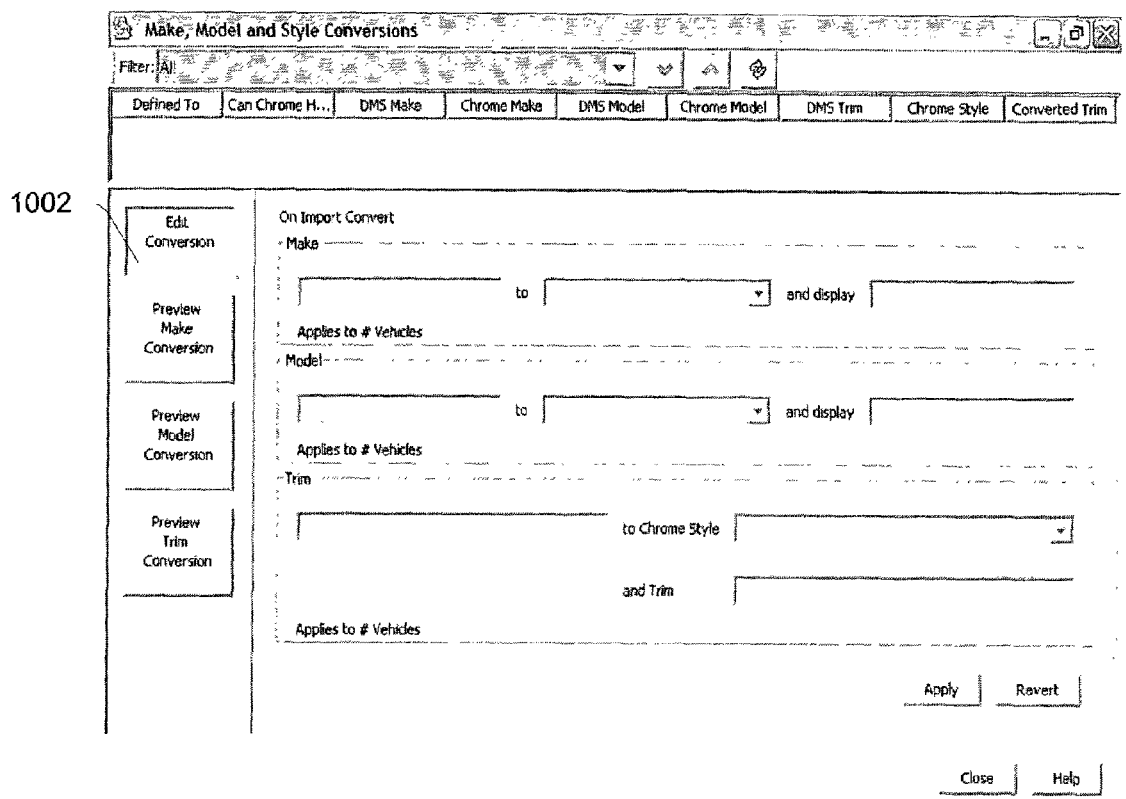
FIG. 10 is a graphical representation of an example user interface (UI) associated with another aspect of the invention, according to one example implementation.
Figure 12:
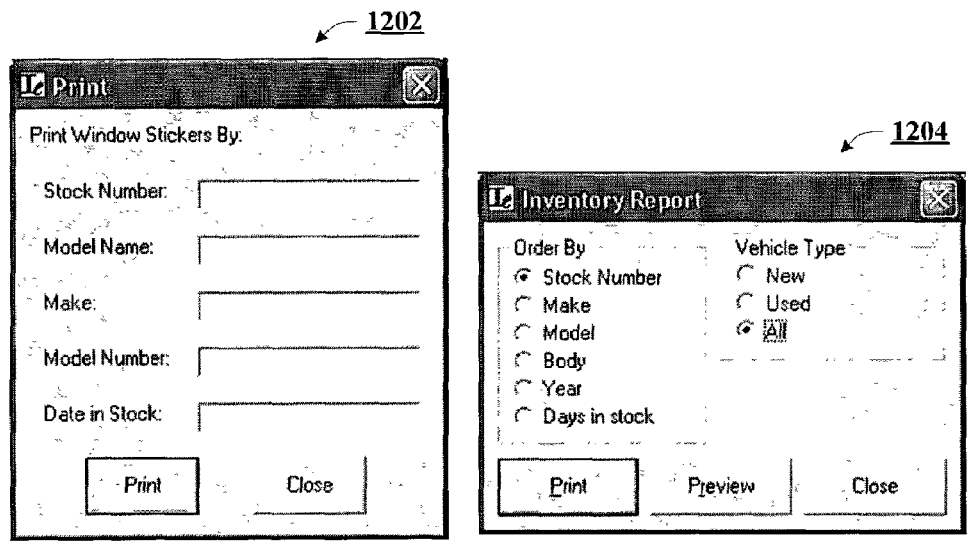
FIG. 12 is a graphical representation of example user interface(s) suitable for use with the export function of the DMI, according to one example implementation.

Turning briefly to FIG. 4, a graphical representation of an example configuration user interface (UI) 400 is presented, according to one example embodiment of the invention. In particular, FIG. 4 illustrates an example UI defining how the import module 212 of DMI 200 handles a particular DMS data format on import. In this regard, the UI 400 includes a DMS field name, a Chrome Inventory Everywhere™ (CIE) field name, and a Special Formatting field, which enable an administrator to configure one or more aspects of the import process. As introduced above, the field mapping information for a particular DMS is retained within a mapping file in DMI 200, but further customization is available through the configuration process 302 using UI's such as that depicted in FIG. 4. Additional configuration examples (e.g., publication of reports, etc.) are depicted in FIGS. 10 and 12, and will be addressed in the context of the publication process defined below.

Once the various aspects of the DMI 200 have been configured by the administrator, the technical support representative of the DMI purveyor, or a combination thereof, DMI 200 is ready for operation. According to one example embodiment, DMI 200 is invoked either by an administrator, or automatically on a schedule defined during the configuration process. Once invoked, control logic 202 of DMI 200 invokes an instance of import module 212 to import content from a data management system (e.g., dealer management system) (DMS) 108 describing a current inventory of products, block 304. The DMS content is imported and translated into a DMI-compliant data format as it is stored in a DMI data structure 208. A more detailed example of the import process 304 is provided below, with reference to FIG. 5.

In block 306, the imported content is automatically reconciled against an independent source of product information, and selectively modified to produce an accurate description of each product within the current inventory. More specifically, upon completion of the import process (304), control logic 202 of DMI 200 invokes an instance of edit module 214 to reconcile the content imported from DMS 108 with an independent source of product information. In addition, edit module 214 includes a user interface (UI) that enables an administrator to modify and/or supplement the individual records of the DMI data structure. The result of the edit process 306 is an accurate, detailed representation of a product inventory that is available to an administrator of DMI 200 for optional analysis via analysis module 216. A more detailed description of the reconciliation and edit process and associated example UI's are provided with reference to FIGS. 6-10, below.

In block 308, the accurate and detailed description of product inventory developed in blocks 304 and 306, above, is ready for selective configuration and export to one or more designated media. The configuration, or publication, of the DMI data structure is performed on a per-selected media 106 basis. That is, control logic 202 of DMI 200 invokes an instance of publication module 218 to configure the DMI data structure for export to any of a wide variety of export media 106 including, but not limited to, web-based services, print-services, marketing services, and the like. An example operation of publication module 214 is provided with reference to FIG. 11, below.

Having introduced the general operation of DMI 200, above, reference is directed to FIGS. 5-12, wherein methods and associated user interface(s) of individual functional elements of the invention are described in greater detail.

Example Import Process

Figure 5:
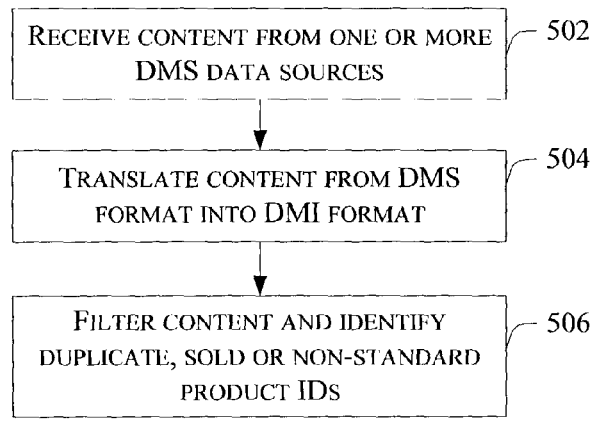
FIG. 5 is a flow chart of an example method of importing content from any of a number of data management systems, according to one aspect of the invention.

FIG. 5 is a flow chart of an example method of operation of import module 212, according to one aspect of the present invention. In accordance with the illustrated example embodiment of FIG. 5, the method 304 begins with block 502 wherein import module 212 receives content from one or more DMS data sources 108.

In block 504, import module 212 accesses an appropriate one or more of a plurality of DMS mapping file(s) (or, translation file(s)) specified during the configuration process to translate the imported content from the DMS format into a DMI-compliant format. According to one example implementation, the translation is performed as the content is received from the DMS source(s) 108. As introduced above, the translation involves the physical mapping of DMS data fields to DMI data fields, and the conversion of DMS data to more readable content, as specified by the administrator.

In block 506, import module 212 filters the received content and identifies any duplicate records, records indicating a particular product instance has been sold, or data records denoting non-standard product identifiers. According to one example implementation, import module 212 identifies unique product identifiers (e.g., VINs) within (or decoded from) the imported DMS content, and denotes within the DMI data structure that the content is imported (as opposed to directly entered by an administrator into the DMI data structure).

According to one embodiment, if records denoting duplicate, sold or non-standard product identifiers are identified, an indication is generated for the administrator, who manually determines the resolution of such condition(s). In an alternate embodiment, the last instance of a record denoting a duplicate product ID is retained; records denoting a sold product ID are removed; and records denoting a non-standard product ID are identified to an administrator for resolution. Accordingly, import module 212 imports and performs an initial scrub of data received from one or more DMS sources 108.

Example Edit Process

Figure 6:
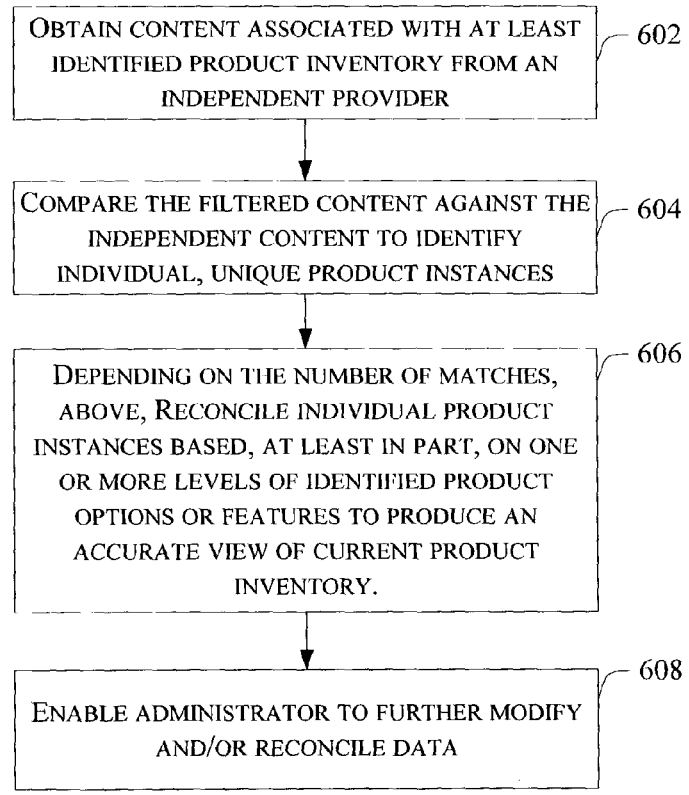
FIG. 6 is a flow chart of an example method of generating an accurate description of a product inventory, according to one aspect of the invention.

FIG. 6 illustrates a block diagram of an example method of operation of edit module 214, according to one aspect of the present invention. In accordance with the illustrate example embodiment of FIG. 6, the method 306 begins with block 602 wherein edit module 214 accesses an independent source(s) 104 of product information associated with at least the products denoted in the DMI data structure created by import module 212. As introduced above, the independent source(s) 104 may well comprise the product manufacturer(s), governmental resource(s) (e.g., city, state, county and/or federal records of such products), or independent industry sources of information (e.g., Chrome Systems® New Vehicle Data™ (NVD), the Realtor® Multiple Listing Service (MLS), etc.), and the like. According to one embodiment, the source of such independent product information is pre-determined, and statically programmed within edit module 214. In alternate embodiments, the source of such independent product information is dynamically assigned during the configuration process by one or more of a DMI administrator, technical representative of the purveyor of the DMI, or a combination thereof.

In block 604, edit module 214 compares the filtered content of the DMI data structure against the content received from the independent source of product information to identify a product type for each individual product record within the DMI data structure. According to one example implementation, edit module 214 compares the filtered content against the Chrome NVD to identify a year, make, model and style (YMMS) of each automobile within the DMI data structure from the unique product identifier (including, e.g., the VIN) and the Chrome NVD. The comparison process will result in either a (1) one-to-one match, (2) a one-to-many match, or (3) a one-to-none match.

If a one-to-many match is identified in block 604, edit module 214 performs additional analysis to reconcile individual product instances based, at least in part, on one or more levels of identified product options or features to produce an accurate view of the current product inventory, block 606. A more detailed explanation of this reconciliation process is presented below, in FIG. 7.

In block 608, once the reconciliation process is completed, edit module 214 may, upon receipt of a command from a DMI administrator, invoke a UI to enable the administrator to further modify and/or supplement the content of the DMI data structure. Example user interface(s) to facilitate this feature is presented with reference to FIGS. 8 and 9, below.

Figure 7:
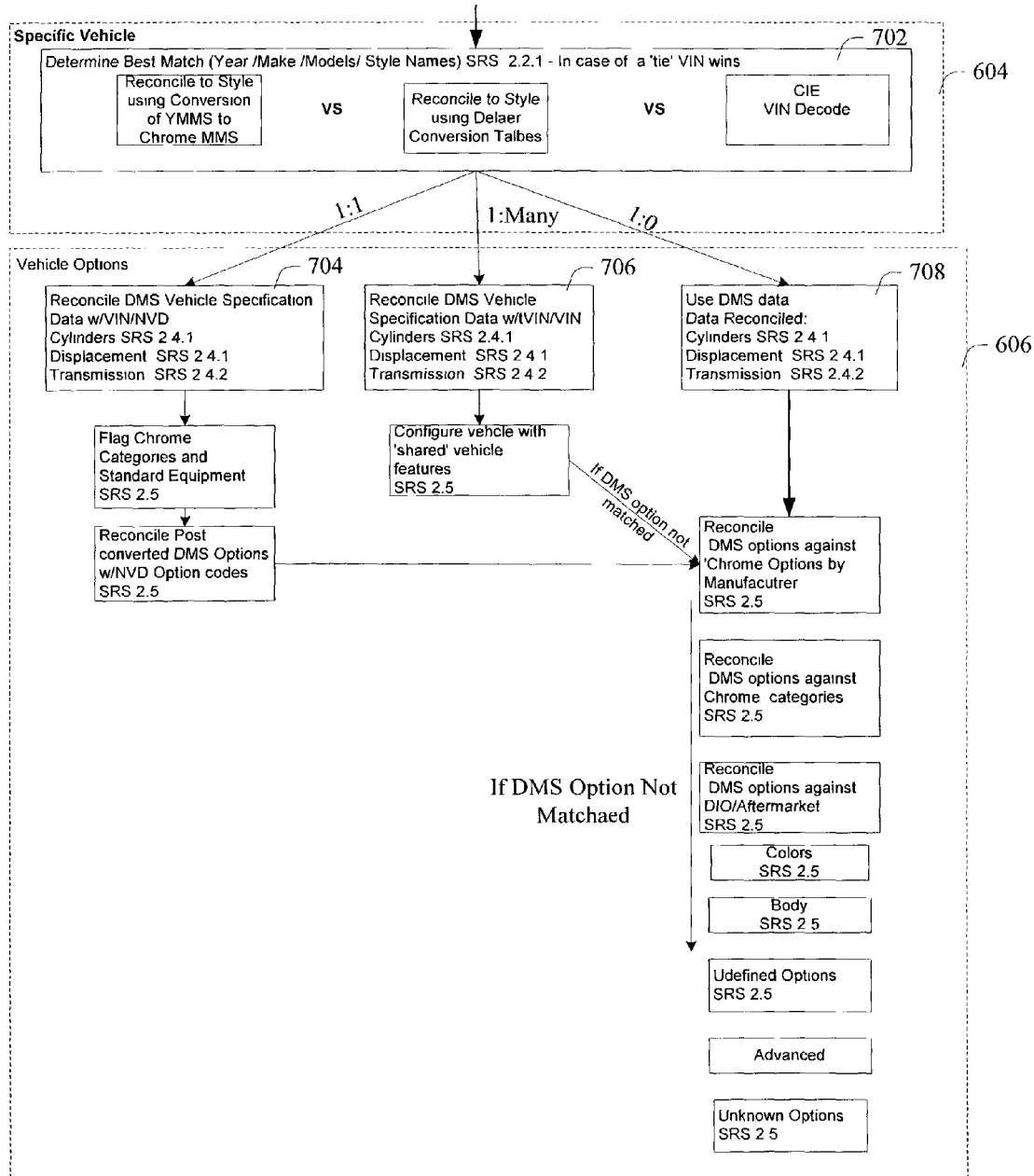
FIG. 7 is a flow chart of an example method of reconciling content in an example automotive application of the invention, according to one example implementation.

Turning to FIG. 7, a flow chart of an example reconciliation method invoked by edit module 214 is presented, according to one example embodiment. In accordance with the illustrated example of FIG. 7 and an automobile dealership application, the method 700 begins with block 604 wherein edit module 214 determines a "best match" in determining a product type for a given product record of the DMI data structure. As depicted, edit module identifies the best match by (1) reconciling to style using a conversion of the year, make, model, style (YMMS) of the data imported from the DMS against the make, model, style (MMS) from the Chrome NVD; (2) reconcile to style using dealer conversion tables (provided during the configuration process); or (3) reconcile to MMS by decoding the VIN from the data imported from the DMS. As introduced above, the result of 604 will be either a 1:1, 1:many, or a 1:none match between a DMS product identifier and a product identifier in the independent source of product content. In either case, the process continues with block 606.

In block 606, where a 1:1 match is identified, the process continues with processing path 704, wherein the edit module 214 reconciles the product specification data received from the DMS against the product specification of the independent data source (e.g., Chrome NVD). Inconsistencies as to standard product information (e.g., engine type (cylinders, displacement) and transmission are resolved in favor of the independent source of product information (e.g., Chrome NVD). In addition, edit module 214 flags categories and standard equipment not denoted within the imported DMS content, and reconciles post converted DMS options with NVD option codes.

In block 606, where a 1:many match is identified, the process continues with processing path 706. As denoted, edit module 214 reconciles the DMS product specification data against the product specification of the independent data source (e.g., the Chrome NVD). Inconsistencies are, again, resolved in favor of the Chrome NVD. As the process continues, edit module configures the vehicle with shared vehicle features, i.e., those features that are common to the "many" matches of the independent data source, before proceeding to further reconcile individual product information, as denoted in processing path 708.

In block 606, where a 1:0 match is identified, the edit module attempts to identify the product type by reconciling the DMS product specification data against the product specification of the independent source of product information (e.g., the engine type, transmission, etc.). Further processing is performed against the Chrome NVD, wherein edit module 214 attempts, in descending order (1) to reconcile DMS options against manufacturer options identified in the Chrome NVD; reconcile DMS options against Chrome NVD categories; reconcile DMS options against dealer installed options (DIO) or after-market options; reconcile based on color, reconcile based on body style; or, reconcile based on undefined options or unknown options. The result is the edit modules best determination of a given car given the information available from the DMS and an independent authority on such products.

Figure 8:
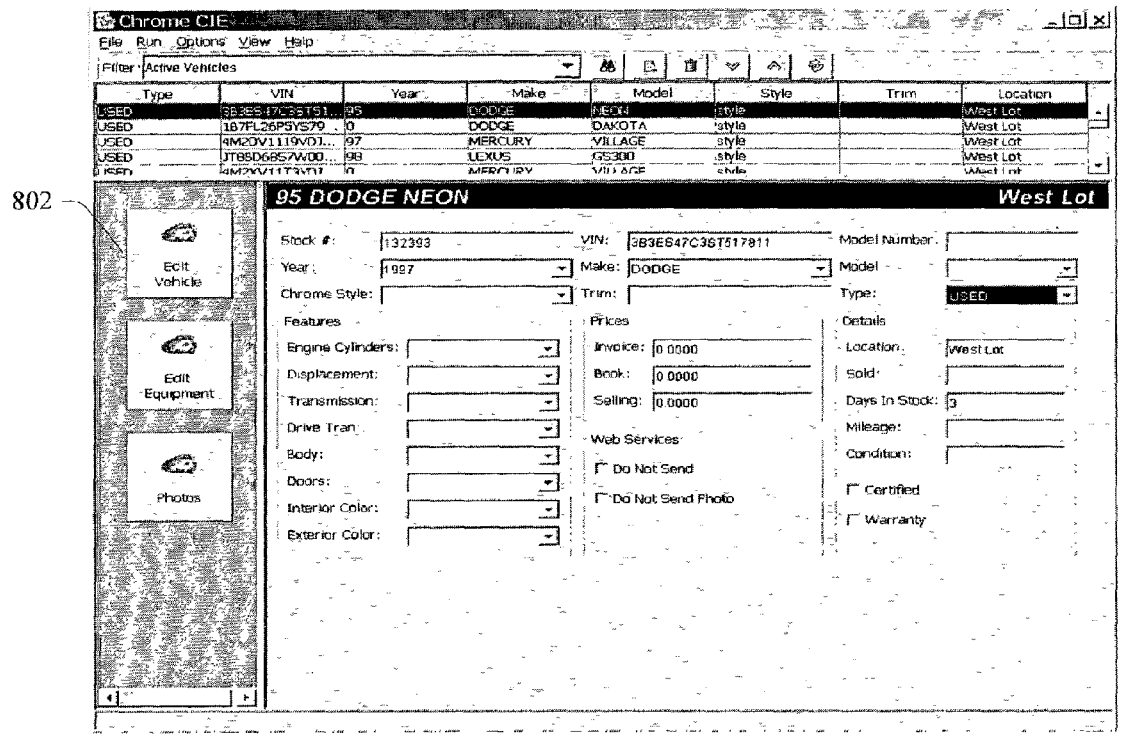
FIG. 8 is a graphical representation of an example user interface (UI) associated with one aspect of the present invention, according to one example implementation.

As introduced above, FIG. 8 provides a graphical illustration of an example user interface (UI) selectively invoked by edit module 214 to enable an administrator to modify or supplement product information, as well as configure certain publication settings, according to one example embodiment of the invention. More particularly, UI 800 depicts a list of active products within a DMI data structure. Selection of one record of the data structure, followed by selection of UI button 802, enables an administrator to modify and/or supplement content of the selected data record of the DMI data structure.

In accordance with the illustrated example implementation, UI 800 is directed to an automobile dealership application. In this regard, certain information (e.g., stock number, VIN number) is pre-populated from information gathered from the DMS and is un-editable (unless a non-standard VIN is identified). Other fields, e.g., year, make, model, trim, product type (new/used), features (options), prices, and miscellaneous details are all editable fields. In addition, according to one example implementation, the administrator can configure whether the particular record of the DMI data structure is sent to web-based media services and, if so, whether a photo of the product is to be sent.

Figure 9:
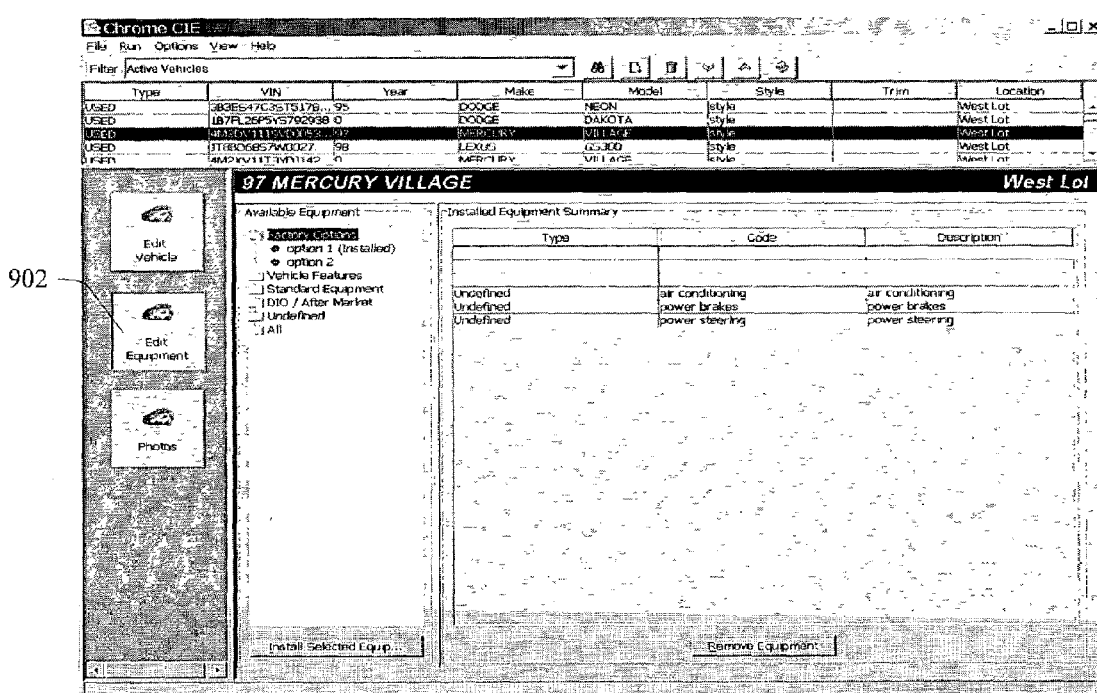
FIG. 9 is a graphical depiction of an example user interface (UI) associated with another aspect of the invention, according to one example implementation.

FIG. 9 is a graphical representation of an example user interface (UI) 900 of active product within a DMI data structure, selectively invoked by edit module 214 to enable an administrator to modify and/or supplement certain optional features of a product records of the DMI data structure. More particularly, selection of UI button 902 enables an administrator to modify/supplement a type, code and description of one or more equipment associated with a selected vehicle record of the DMI data structure. In this regard, edit module 214 of DMI 200 provides an administrator with an intuitive, user interface that enables the administrator to modify and/or supplement data obtained from any of a number of DMS systems without having to learn the individual nuances of the DMS systems. Moreover, as developed more fully below, the DMI 200 enables such enhanced content to be exported to any of a variety of media source 108.

FIG. 10 is a graphical illustration of another example user interface 1000 selectively invoked by DMI 200 to enable an administrator to configure one or more aspects of DMI operation, according to one example embodiment of the present invention. In accordance with the illustrated example embodiment of FIG. 10, DMI 200 selectively invokes UI 1000 from, e.g., a master DMI UI (not specifically shown) upon selection of interface button 1002. UI 1000 enables an administrator to edit one or more conversion parameters associated with the import process 500 performed by import module 212. As shown, UI 1000 enables an administrator to modify the conversion of make, model or trim information from a DMS specification to one supported by DMI 200, as well as specifying a more readable variant, thereby making the DMI interface more user-friendly.

Example Export Process

Figure 11:
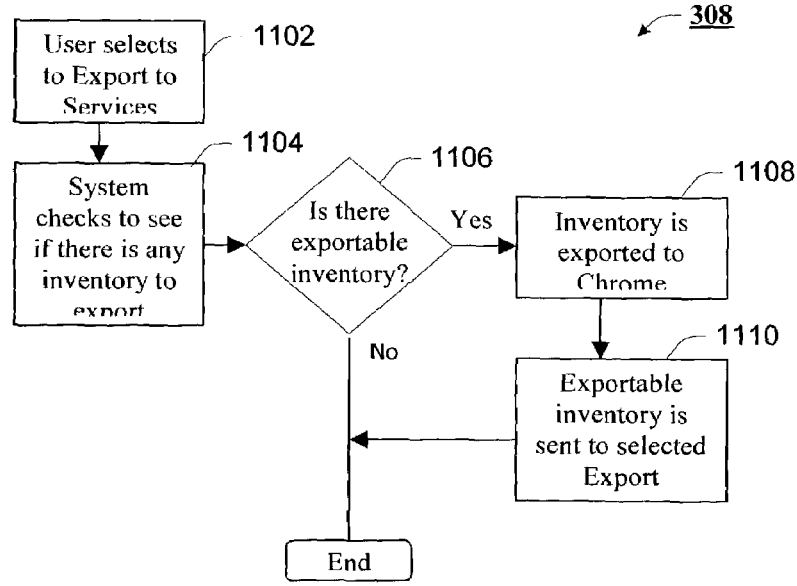
FIG. 11 is a flow chart of an example method of exporting content from the DMI, according to one aspect of the present invention.

Turning next to FIG. 11, a flow chart of an example method of operation of publication module 218 is presented, according to one example embodiment of the present invention. For purposes of illustration, and not limitation, the description of FIG. 11 is provided in the context of an example automotive application. Accordingly, the method 308 begins with block 1102 wherein an administrator selects to export one or more records of the DMI data structure to one or more media service(s) 106. As introduced above, control logic 202 invokes an instance of publication module 218 to perform such publication services.

In block 1104, publication module 218 checks the DMI data structure to confirm that there is, in fact, data records (associated with current inventory) to export. In block 1106, if publication module determines that the DMI data structure is empty, or that there is no current (active) inventory, the process ends.

If, in block 1106, the DMI data structure contains records associated with an active inventory, publication module selectively configures such content for export to one or more designated export media 106.

According to one example implementation, regardless of the export media 106 selected by the DMI administrator, publication module 218 automatically configures the content of the DMI data structure for export to the purveyor of DMI 200. One purpose for such export is to provide technical representatives of the purveyor to view the same DMI data structure of the client, for purposes of technical support and debugging problems reported by the DMI administrator. Another purpose of such export, in the case where the purveyor is also the independent source of product information, is that the DMI data structure received from publication module 218 on the client can be used to modify/supplement the information contained within the independent data source (e.g., the Chrome NVD).

In block 1110, once properly configured, publication module 218 sends the exportable inventory to the one or more selected media 106, as the publication process is completed. As introduced above, the export services of publication module 218 support web-based services (e.g., web-sites, email mailings, etc.), marketing services (e.g., multimedia outlets, newspapers, magazines, bulk-mail purveyors, and the like), as well as local printing services. In this regard, publication module 218 includes user interfaces through which an administrator can generate product buyer's guides, inventory reports, and the like. Examples of such user interfaces are presented with reference to FIG. 12.

In FIG. 12, graphical representations of two (2) example user interfaces associated with publication module 218 are presented, according to one example embodiment. As depicted, UI 1202 enables an administrator to print a product buyer's guide (e.g., a window sticker for an automobile) from the information contained within the DMI data structure. As shown, UI 1202 enables the administrator to identify the product (vehicle) by one or more of a stock number, model name, make, model number or date in stock. If the stock number is provided, a single window sticker is generated associated with the identified product. If the stock number is not provided, yet one or more of the other fields are populated, a series of one or more window stickers may well be generated.

UI 1204 is selectively invoked by publication module 218 to enable an administrator to print any of a number of reports of their current inventory. By selection of one or more of the radio buttons associated with stock number, make, model, body, year, days in stock, new product, used product, etc., DMI 200 invokes an instance of analysis module 216 which then analyzes the DMI data structure for the requested content, which is configured and published by publication module.

Example Host Computing Appliance

Figure 13:
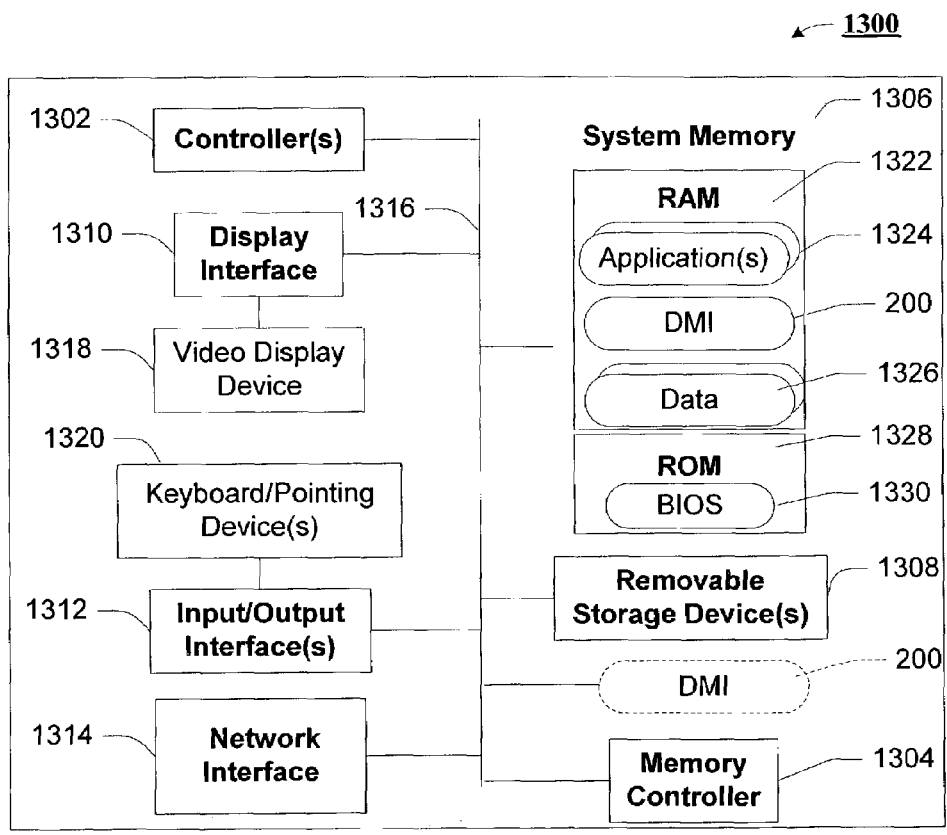
FIG. 13 is a block diagram of an example computing appliance within which the teachings of the present invention may well be implemented, according to two disparate embodiments of the invention.

Turning to FIG. 13, a block diagram of a computing appliance 1300 within which the DMI 200 may well be implemented is depicted. In accordance with the illustrated example embodiments of FIG. 1300, computing appliance 1300 is depicted comprising one or more of controller(s) 1302, a memory controller 1304, system memory 1306, one or more removable storage devices 1308, a display interface 1310, input/output interface(s) 1312 and a network interface 1314, each coupled through one or more communication media 1316. According to one example implementation, the system memory 1306 of computing appliance 1300 is depicted comprising volatile memory (e.g., random access memory) 1322 and non-volatile memory (e.g., read-only memory) 1328. The random access memory 1322 typically stores operational content such as, e.g., one or more applications 1324, data 1326 and, in accordance with one example embodiment of the invention, one or more instances of the data management interface (DMI) 200 described herein. In alternate implementations (denoted with dashed lines) one or more functional elements of DMI 200 may well be implemented in hardware, and communicatively coupled to the communication media 1316, as shown.

But for the innovative teachings of the DMI 200 described above, the elements 1302-1330 of computing appliance 1300 are intended to represent such devices as they are commonly known in the art. Accordingly, the function of such elements need not be described further.

Alternate Embodiments

Those skilled in the art, based on the foregoing, may well recognize that one or more aspects of the DMI 200 may well be embodied in alternate implementations without deviating from the spirit and scope of the present invention.

Figure 14:
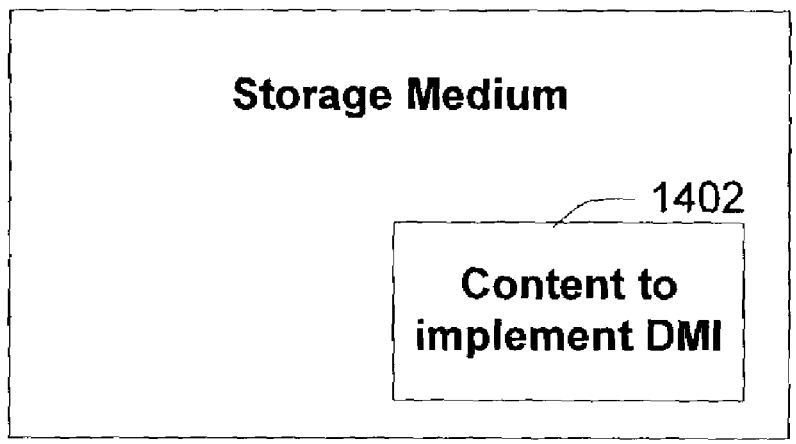
FIG. 14 is an article of manufacture having stored thereon content that when executed by an accessing machine, causes the machine to implement an embodiment of the teachings of the present invention, according to yet another embodiment of the invention.

In FIG. 14, for example, an article of manufacture, e.g., a storage medium, 1400 is presented comprising content 1402 to implement on or more aspects of DMI 200. That is, the DMI 200 of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

What is claimed is:

1. A method comprising:

importing electronic content describing product inventory from any of a number of data management systems (DMS), the content including one or more product descriptors that uniquely identify individual instances of products within one or more corresponding physical inventories;

comparing the imported electronic content with corresponding electronic content available from an independent source to determine whether the imported electronic content includes erroneous information, wherein the electronic content available from the independent source comprises content associated with the individual instances of products obtained from an independent electronic source of product information; and selectively modifying the imported electronic content describing the one or more physical inventories based, at least in part on results of the comparison to correct erroneous information to generate an enhanced representation of the imported electronic content.

2. A method according to claim 1, the method further comprising:

exporting the selectively modified content to any one or more of a number of media.

3. A method according to claim 2, the element of exporting comprising:

identifying one or more media services selected by an administrator; and configuring the enhanced content for publication by each of the select one or more media services.

4. A method according to claim 3, wherein the media services include one or more of web-based services, marketing services, local publication services.

5. A method according to claim 1, the element of importing comprising:

accessing a data management system (DMS) file to obtain current inventory information; and selectively translating one or more elements of the current inventory information from a DMS data format to a DMS-independent data format.

6. A method according to claim 5, the element of selectively modifying comprising:

accessing the independent source of product information;

identifying zero or more instances of a product corresponding to the one or more standard product descriptors; and modifying and/or supplementing the information obtained from the DMS with information associated with the unique product instance obtained from the independent source of product information.

7. A method according to claim 6, wherein the independent source of product information is obtained from a manufacturer of the product through a network connection.

8. A method according to claim 6, wherein the independent source of product information is obtained from an independent data resource associated with an industry from which the identified product is derived.

9. A method according to claim 8, wherein the independent data source is a new vehicle database (NVD).

10. A method according to claim 8, wherein the independent data source is the Multiple Listing Service (MLS).

11. A computing system comprising:
   a storage medium having content stored therein; and
   a controller, coupled with the storage medium, to execute at least a subset of the content stored therein to implement a method according to claim 1.

12. A storage medium comprising content which, when executed by an accessing machine, causes the machine to implement a data management interface (DMI) to import content describing product inventory from any of a number of data management systems (DMS), the content including one or more product descriptors that uniquely identify individual instances of one or more products within corresponding physical inventories, to compare the imported content with corresponding content available from an independent source to determine whether the imported content includes erroneous information, wherein the content available from the independent source comprises content associated with the individual instances of products obtained from an independent electronic source of product information and to selectively modify the imported content describing the physical inventories based, at least in part, on results of the comparison to correct erroneous information to generate an enhanced representation of the imported content.

13. A data management interface (DMI) comprising:
   an import module, communicatively coupled with one or more disparate data management system(s) (DMS), to import content describing a product inventory from at least a subset of the data management systems (DMS), the content including one or more product descriptors that uniquely identify individual instances of products within one or more corresponding physical inventories; and
   an edit module, responsive to the import module, to compare the imported content with corresponding content available from an independent source to determine whether the imported content includes erroneous information, wherein the content available from the independent source comprises content associated with the individual instances of products obtained from an independent electronic source of product information and to selectively modify the imported content describing the physical inventories based, at least in part, on results of the comparison selectively modify the imported content describing the one or more physical inventories to correct erroneous information to generate an enhanced representation of the imported content.

14. A DMI according to claim 13, wherein the import module translates the content received from the one or more DMS from a DMS-format into a DMI-compliant format.

15. A DMI according to claim 13, wherein the import module filters the imported content to remove duplicate records, records associated with sold inventory, and records denoting non-standard product codes.

16. A DMI according to claim 13, wherein the edit module enables an user of the DMI to modify and/or supplement one or more elements of a record associated with the one or more records of a DMI data structure denoting an active product inventory.

17. A DMI according to claim 13, further comprising:
   an analysis module, responsive to the edit module, selectively invoked by an administrator to generate any of a number of predetermined or dynamically defined reports from any one or more records of a DMI data structure denoting an active product inventory.

18. A DMI according to claim 13, further comprising:
   a publication module, responsive to the edit module, selectively invoked by an administrator to configure one or more selected records of a DMI data structure denoting an active product inventory to any of a number of export services.

19. A DMI according to claim 18, wherein the export services include one or more of web-based services, marketing services, or local print services.

20. A computing system comprising:
   a storage medium having content stored therein; and
   a processor, coupled to the storage medium, to execute at least a subset of the content stored thereon to implement a DMI according to claim 13.

* * * * *